United States Patent
Stern (10) Patent No.: US 8,648,497 B2
(45) Date of Patent: Feb. 11, 2014

(54) PHOTOVOLTAIC POWER PLANT WITH DISTRIBUTED DC-TO-DC POWER CONVERTERS

(75) Inventor: Michael Joseph Stern, Westlake Village, CA (US)

(73) Assignee: Renewable Power Conversion, Inc., San Luis Obispo, CA (US)

( * ) Notice: Subject to any disclaimer, the term of this patent is extended or adjusted under 35 U.S.C. 154(b) by 592 days.

(21) Appl. No.: 12/656,378

(22) Filed: Jan. 28, 2010

(65) Prior Publication Data

US 2010/0195361 A1 Aug. 5, 2010

Related U.S. Application Data

(60) Provisional application No. 61/148,770, filed on Jan. 30, 2009.

(51) Int. Cl.
*H02J 1/00* (2006.01)
*G05F 1/00* (2006.01)

(52) U.S. Cl.
USPC .............................. 307/82; 323/222; 323/272

(58) Field of Classification Search
USPC ...................................... 307/82; 323/222, 272
See application file for complete search history.

(56) References Cited

U.S. PATENT DOCUMENTS 7,602,165 B2 * 10/2009 Watanabe et al. ............. 323/282
8,093,756 B2 * 1/2012 Porter et al. ..................... 307/72
2007/0230220 A1 * 10/2007 Chan et al. ....................... 363/16
2008/0136350 A1 * 6/2008 Tripathi et al. ................ 315/294
2009/0116266 A1 * 5/2009 Lai et al. .......................... 363/40
2010/0133911 A1 * 6/2010 Williams et al. ................ 307/82

* cited by examiner

*Primary Examiner* — Rexford Barnie
*Assistant Examiner* — Dru Parries (57) ABSTRACT

A solar photovoltaic plant is disclosed where a number of distributed DC-to-DC converters are used in conjunction with a central DC-to-AC converter. Each DC-to-DC converter is dedicated to a portion of the photovoltaic array and tracks the maximum power point voltage thereof. The DC-to-DC converters also boost the photovoltaic voltage and regulate a DC output current for transmission to the central DC-to-AC converter. Five distinct advantages are had over the prior art. First, efficiencies in intra-field power collection are greatly improved by transferring power at higher DC voltages. Second, the number of independent photovoltaic maximum power point trackers in the power plant can be increased, in a cost effective manner, to optimize the overall photovoltaic array energy harvest. Third, each DC-to-DC converter output "looks" like a current source at the input of the DC-to-AC converter and therefore can be easily paralleled. Fourth, the current source nature of the DC-to-DC converter outputs enables the DC-to-AC converter to operate with a minimum, fixed DC bus voltage to provide maximum DC-to-AC power conversion efficiencies. And fifth, each distributed DC-to-DC converter can isolate a faulted portion of the photovoltaic array while the remainder of the array continues producing power.

10 Claims, 6 Drawing Sheets

PHOTOVOLTAIC POWER PLANT WITH DISTRIBUTED DC-TO-DC POWER CONVERTERS

This application claims priority of Provisional Application No. 61/148,770

BACKGROUND OF THE INVENTION

In large scale, prior art photovoltaic power plants, a great number of solar photovoltaic modules are connected in series and then in parallel to facilitate DC power collection at a central location where it can then be converted to AC power by a DC-to-AC power converter or inverter.

Typically, the sizing of conductors in any electrical installation is based on how much current a conductor can handle and remain at a safe temperature. In photovoltaic power plants, the value of the photovoltaic energy is high and conductors are oversized with respect to ampacity in order to limit the overall resistive wiring losses of the system. In a properly designed photovoltaic power plant, the incremental cost to increase the size of a conductor to save one watt of resistive losses should be equal to the cost of installing an additional watt of photovoltaic generating capacity. As such, the cost of collecting power from acres of solar panels is a significant portion of the overall power plant cost. If a megawatt power plant can be built for $5/Watt AC, then a 1% reduction in copper conductor losses could save $50,000 in system costs.

If the maximum power point voltage of each solar module could be individually tracked, the overall energy harvest from the photovoltaic power plant would be maximized. This extreme approach would not be cost effective. However, as the number of maximum power point trackers in a system is increased, the annual energy harvest will be increased as well. In large power plants, sections of the total array will have different wind exposures, different local soil reflectivity, different cloud cover, different soiling, different shadowing, different aging characteristics and different "factory" module characteristics. All of these factors will affect the maximum power point voltage of any group of modules. If one large maximum-power-point-tracking DC-to-AC inverter converts the entire array power, this power converter will operate at an average PV operating point. The portions of the array that are statistically weaker or stronger will not operate at their maximum power point voltages and array harvest will be compromised. A number of tradeoffs need to be considered, however, for any system design between complexity (and therefore reliability), power conversion inefficiencies of the maximum power point trackers, system costs and array harvest enhancements.

Figure 2:
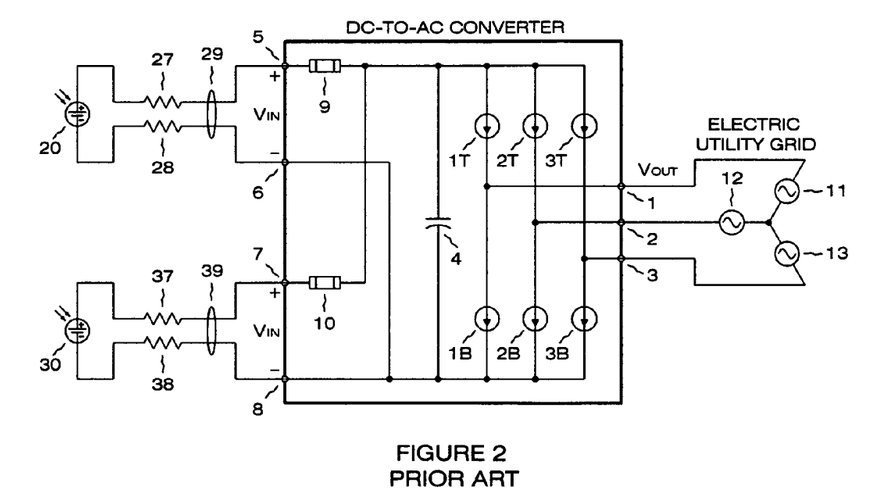
FIG. 2 is a simplified electrical schematic illustrating a prior art photovoltaic power system without distributed DC-to-DC power converters.

FIG. 2 illustrates a typical, prior art photovoltaic power plant. Photovoltaic sub-array 20 is a collection of series and parallel connected photovoltaic modules. Conductors 27 and 28 carry the combined current of sub-array 20 in conduit 29 to DC-to-AC converter inputs 5 and 6. This circuit path from a large subarray to the DC-to-AC converter is commonly referred to as a home run. Conductors 27 and 28 are indicated in FIG. 2 as resistors to represent the total resistance of the conductors for this home run. In a similar way, photovoltaic subarray 30 is connected to DC-to-AC converter inputs 7 and 8 via conductors 37 and 38 in conduit 39. FIG. 2 only shows two home runs, for clarity, but the number is variable depending on the system design and photovoltaic array layout. In large power plants, the distance traversed by a given home run can be substantial. To achieve efficient DC power collection in any power plant, it is desirable to make the operating voltage of subarrays 20 and 30 as high as practical. Higher voltage translates to lower current for a given power level and therefore smaller conductor cross sectional area resulting in lower conductor and conduit costs. Typically, the maximum voltage is limited by the photovoltaic module voltage rating from active elements to frame or external insulating surfaces.

In FIG. 2, DC-to-AC converter inputs 5 and 7 are connected to fuses 9 and 10 respectively then electrically paralleled to one side of capacitor 4. DC-to-AC converter inputs 6 and 8 are electrically paralleled to the remaining side of capacitor 4. The current and voltage characteristic of subarray 20 or 30 is that of an imperfect voltage source or an imperfect current source, depending on the operating point of the subarray. As such, the power source "seen" at the DC-to-AC converter inputs is "soft" with limited voltage and limited current. Capacitor 4 serves to convert this soft source to a low impedance voltage source capable of delivering high peak currents which are orders of magnitude greater than what either subarray could deliver. DC-to-AC converter output terminals 1, 2 and 3 are connected to a polyphase electric utility grid. The utility grid is modeled as AC voltage sources 11, 12 and 13. For each phase, the DC-to-AC converter regulates sinusoidal current into the utility grid in phase with the utility voltage at each output terminal 1, 2 and 3 to source power into the grid at unity power factor. The sinusoidal current sources within the DC-to-AC converter 1T/1B, 2T/2B and 3T/3B are modeled as controllable current sources capable of sourcing regulated half-sinewaves of current into the positive half-sinewave of utility voltage and sinking regulated half-sinewaves of current out of the negative half-sinewave of utility voltage for each phase.

To summarize, the most salient points of this discussion and how they relate to the invention, FIG. 2 illustrates DC sources 20 and 30 converted to a combined DC voltage source by capacitor 4 in turn converted to a polyphase AC current source to transfer power into a polyphase AC voltage source, the electric utility grid.

DETAILED DESCRIPTION OF THE INVENTION

Figure 1:
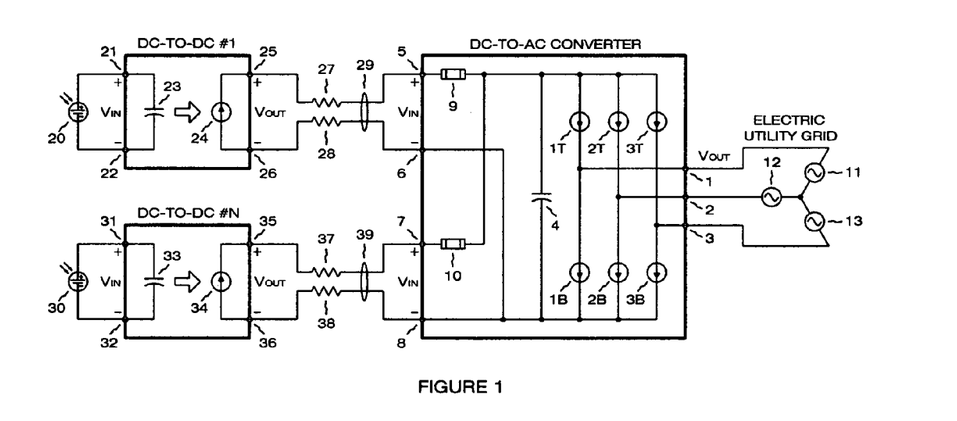
FIG. 1 is a simplified electrical schematic illustrating the basic form of the invention with a number of distributed DC-to-DC power converters each having current source outputs and each feeding a central DC-to-AC power converter.

FIG. 1 illustrates the basic form of the invention. Photovoltaic sub-array 20 is a collection of series and parallel connected photovoltaic modules connected at input terminals 21 and 22 of DC-to-DC converter #1 and across capacitor 23.

The current and voltage characteristic of subarray 20 is that of an imperfect voltage source or an imperfect current source, depending on the operating point of subarray 20. As such, the power source "seen" at the DC-to-AC converter inputs is "soft" with limited voltage and limited current. Capacitor 23 serves to convert this soft source to a low impedance voltage source capable of delivering high peak currents which are orders of magnitude greater than what either subarray could deliver. DC-to-DC converter #1 converts this voltage source to a DC current source. Conductors 27 and 28 in conduit 29 carry the output current of DC-to-DC converter #1. Conductors 27 and 28 are indicated in FIG. 1 as resistors, each representing the total resistance of each conductor from output terminals 25 and 26 of DC-to-DC converter #1 to the input terminals 5 and 6 of the DC-to-AC converter, respectively. In a similar way, photovoltaic subarray 30 is connected to DC-to-DC converter #N with inputs 31 and 32 and with outputs 35 and 36 connected to DC-to AC converter inputs 7 and 8 respectively via conductors 37 and 38 in conduit 39. FIG. 1 only shows two DC-to-DC converters, for clarity, but the number is variable depending on the system design and photovoltaic array layout. In large power plants, the distance traversed between a DC-to-DC converter and the DC-to-AC converter can be substantial. To achieve efficient DC power collection in any power plant, it is desirable to make the transmission voltage between DC-to-DC converters and the DC-to-AC converter as high as practical. Higher voltage translates to lower current for a given power level and therefore smaller conductor cross sectional area resulting in lower conductor and conduit costs.

In FIG. 1, DC-to-AC converter inputs 5 and 7 are connected to fuses 9 and 10 respectively then electrically paralleled at one side of capacitor 4. DC-to-AC converter inputs 6 and 8 are electrically paralleled to the remaining side of capacitor 4. DC-to-AC converter output terminals 1, 2 and 3 are connected to a polyphase electric utility grid. The utility grid is modeled as AC voltage sources 11, 12 and 13. For each phase, the DC-to-AC converter regulates sinusoidal current into the utility grid in phase with the utility voltage at each output terminal 1, 2 and 3 to source power into the grid at unity power factor. The sinusoidal current sources in the DC-to-AC converter 1T/1B, 2T/2B and 3T/3B are modeled as controllable current sources capable of sourcing regulated half-sinewaves of current into the positive half-sinewave of utility voltage and sinking regulated half-sinewaves of current out of the negative half-sinewave of utility voltage.

To summarize, the most salient points of this discussion and how they relate to the invention, FIG. 1 illustrates photovoltaic sources 20 and 30 each converted to independent DC current sources, in turn paralleled and converted to a common voltage source by capacitor 4, then in turn converted to a polyphase AC current source to transfer power into a polyphase AC voltage source, the electric utility grid. The invention is a method of using a plurality of distributed DC-to-DC converters, each having a current source output, connected in parallel at the input of a central DC-to-AC inverter.

Figure 3:
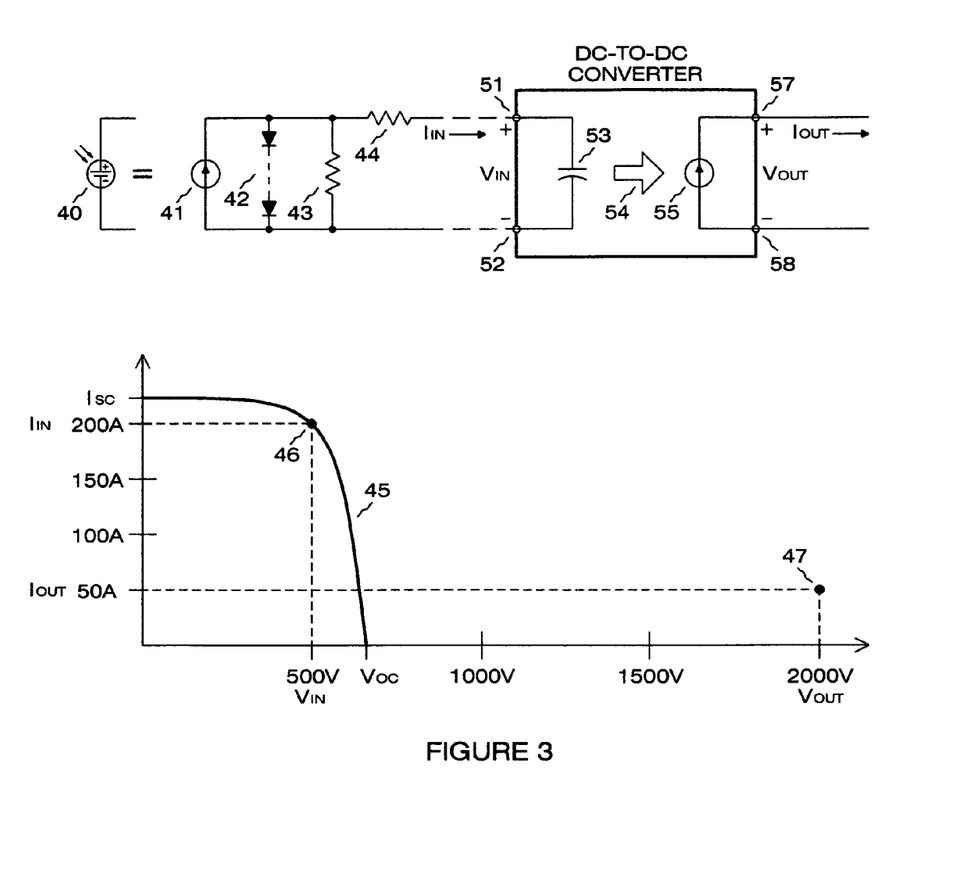
FIG. 3 graphically illustrates the DC-to-DC power conversion approach per the invention with respect to how the DC-to-DC converters transform a typical, imperfect photovoltaic source into a classic current source.

FIG. 3 graphically illustrates the invention DC-to-DC conversion approach and value thereof. Photovoltaic subarray 40 is a collection of series and parallel connected photovoltaic modules illustrated by the standard schematic symbol. Current source 41, shunt diode 42, shunt resistor 43 and series resistor 44 comprise a simplified equivalent circuit of subarray 40. Shunt diode 42 will have one junction drop per series connected photovoltaic cell. Curve 45 is the characteristic current/voltage operating point of subarray 40 for an arbitrary set of environmental conditions. Operating point 46 is the maximum power point of subarray 40. The desired function of the DC-to-DC converter is to dynamically seek the maximum power point voltage 46 of subarray 40 and source a current into an output voltage across terminals 57 and 58 greater than the input voltage across terminals 51 and 52. To accomplish this, capacitor 53 converts subarray 40 from a soft power source with limited voltage and limited current into a low impedance voltage source. Switch mode power conversion 54 is performed to regulate a DC output current 55 into whatever voltage exists across output terminals 57 and 58.

In the example illustrated in FIG. 3, 100 kW is being converted and conversion losses are assumed negligible. The input voltage, $V_{IN}$ of 500V, and input current, $I_{IN}$ of 200 A, correspond to the maximum power point 46 on subarray 40 current/voltage curve 45. The output voltage, $V_{OUT}$ of 2000V, is specifically regulated as a core part of this invention by the external DC-to-AC converter. The output current, $I_{OUT}$ of 50 A, is the 100 kW power level divided by the output voltage, $V_{OUT}$. For the example shown, the relative cross-sectional area requirement for conductors from a subarray (prior art reference) or DC-to-DC converter to the DC-to-AC converter without and with the invention is 16 to 1. The magnitude of the output current was reduced by 4 to 1 so that the resistive losses, proportional to the square of the current ($W_{Loss}=I^2R$), are reduced 16 to 1.

Referring again to FIG. 3, it should be noted that the DC-to-DC conversion process also converts or transforms a "sloppy" DC source with voltages that can vary in a 2 to 1 ratio, from open circuit to maximum power point voltages over the range of typical environmental conditions, to an output with a fixed voltage and with current that varies with the level of power being converted. The output of the DC-to-DC converter now looks electrically like a perfect photovoltaic source.

Figure 4:
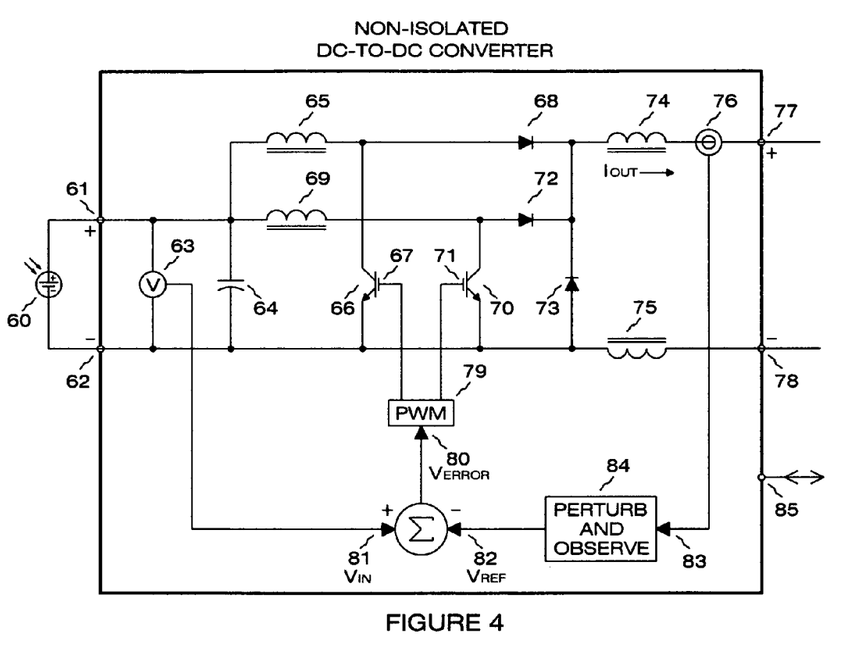
FIG. 4 is a simplified electrical schematic illustrating the preferred embodiment of the DC-to-DC converter electrical topology and control method.

FIG. 4 illustrates the preferred embodiment of the DC-to-DC converter electrical topology and control method. Photovoltaic source 60 is a collection of series and parallel connected photovoltaic modules connected to the input terminals 61 and 62 and across capacitor 64. Inductor 69, IGBT 70 and rectifier 72 are configured as a typical non-isolated boost circuit. In parallel, there is another, typical non-isolated boost circuit comprising inductor 65, IGBT 66 and rectifier 68. Both boost circuits supply current to inductors 74 and 75. Rectifier 73 used to freewheel the current in inductors 74 and 75 when neither rectifier 68 or 72 is in conduction. Inductors 65 and 69 may also have taps where the IGBT collector connection splits the inductor windings into two sections and were the rectifier connection point remains unchanged. Current sensor 76 senses output current $I_{OUT}$. Voltage sensor 63 senses photovoltaic source 60 voltage. In operation, a nominal reference voltage 82 ($V_{REF}$) is set by perturb-and-observe circuit 84 and is compared to feedback signal 81 ($V_{IN}$). Signal 81 ($V_{IN}$) is proportional to photovoltaic subarray 60 voltage. Both signals 81 and 82 are scaled volt per volt. The difference between signals 81 and 82 is amplified and processed to create signal 80 ($V_{ERROR}$). Signal 80 ($V_{ERROR}$) is then applied to PWM converter 79. PWM converter 79 drives each IGBT gate 67 and 71 with a high frequency pulse train where the gate on-time to gate off-time ratio is a function of signal 80 ($V_{ERROR}$). When signal 81 ($V_{IN}$) is greater than signal 82 ($V_{REF}$), the gate on-time to gate off-time ratio is increased to draw more current from source 60 and capacitor 64. When signal 81 ($V_{IN}$) is less than signal 82 ($V_{REF}$), the gate on-time to gate off-time ratio is decreased to draw less current from source 60 and capacitor 64. This constitutes a servo loop which regulates the voltage of photovoltaic source 60 to the desired reference voltage as programmed by signal 82 ($V_{REF}$). PWM converter 79 drives each IGBT gate with a different high frequency pulse train where gate 67 and gate 71 are never driven on at the same time. This interleaved operation of two boost circuits reduces the input and output current switching frequency ripple. After perturb-and-observe circuit 84 has set an initial value of signal 82 ($V_{REF}$), the resultant amplitude of signal 83 ($I_{OUT}$) is logged, the value of signal 82 ($V_{REF}$) is incrementally stepped and the resultant amplitude of signal 83 ($I_{OUT}$) is logged and compared to the previous logged value. If signal 83 ($I_{OUT}$) was increased, signal 82 ($V_{REF}$) is incrementally stepped in the same direction. If decreased, signal 82 ($V_{REF}$) is incrementally stepped in the opposite direction. Since the output voltage across DC-to-DC converter terminals 77 and 78 is fixed by the external DC-to-AC converter, the maximum power point of photovoltaic subarray 60 is captured when the maximum amplitude of signal 83 ($I_{OUT}$) is determined by this iterative, perturb-and-observe algorithm. The perturb-and-observe algorithm is ongoing to dynamically track the maximum power point of subarray 60 as environmental conditions change. Communication port 85 is a bi-directional serial communications link with the DC-to-AC converter. Control power for the DC-to-DC converter could either be derived from subarray 60 or from an external source.

Figure 5:
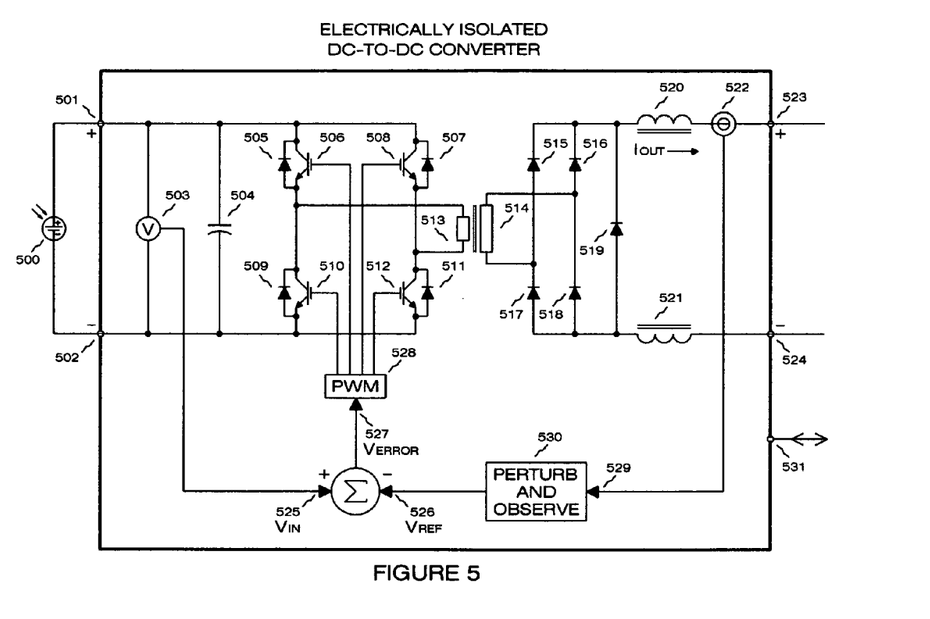
FIG. 5 is a simplified electrical schematic illustrating an alternate DC-to-DC converter embodiment wherein the DC-to-DC converter inputs and outputs are galvanically isolated.

FIG. 5 illustrates an alternate DC-to-DC converter embodiment where the DC-to-DC converter inputs and outputs are electrically or galvanically isolated. The control methodology is essentially the same as in FIG. 4. Photovoltaic source 500 is a collection of series and parallel connected photovoltaic modules connected to the input terminals 501 and 502 and across capacitor 504. Elements 505, 507, 509 and 511 are IGBT/diode combinations arranged in a typical, known full bridge topology driving high frequency transformer primary winding 513. High frequency transformer secondary winding 514 is connected to a typical full bridge rectifier comprising diodes 515, 516, 517 and 518. The full bridge rectifier supplies current to inductors 520 and 521. Inductors 520 and 521 may or may not be coupled. Rectifier 519 is used to freewheel inductors 520 and 521 with a lower loss, single junction voltage drop. Current sensor 522 senses output current $I_{OUT}$. Voltage sensor 503 senses photovoltaic source 500 voltage. In operation, a nominal reference voltage 526 ($V_{REF}$) is set by perturb-and-observe circuit 530 and is compared to signal 525 ($V_{IN}$). Signal 525 ($V_{IN}$) is proportional to photovoltaic subarray 500 voltage. Both signals 525 and 526 are scaled volt per volt. The difference between signals 525 and 526 is amplified and processed to create signal 527 ($V_{ERROR}$). Signal 527 ($V_{ERROR}$) is then applied to PWM converter 528. PWM converter 528 drives IGBT gate pairs 506/512 and 508/510 with high frequency pulse trains where the gate on-time to gate off-time ratio is a function of signal 527 ($V_{ERROR}$); when signal 525 ($V_{IN}$) is greater than signal 526 ($V_{REF}$), the gate on-time to gate off-time ratio is increased to draw more current from source 500 and capacitor 504, when signal 525 ($V_{IN}$) is less than signal 526 ($V_{REF}$), the gate on-time to gate off-time ratio is decreased to draw less current from source 500 and capacitor 504. This constitutes a servo loop which regulates the voltage of photovoltaic source 500 to the desired reference voltage as programmed by signal 526 ($V_{REF}$). PWM converter 528 drives each IGBT gate pair with a different high frequency pulse train where gate pairs 506/512 and 508/510 are never driven on at the same time. After perturb-and-observe circuit 530 has set an initial value of signal 526 ($V_{REF}$), the resultant amplitude of 529 ($I_{OUT}$) is logged, the value of signal 526 ($V_{REF}$) is incrementally stepped and the resultant amplitude of 529 ($I_{OUT}$) is logged and compared to the previous logged value. If 529 ($I_{OUT}$) was increased, signal 526 ($V_{REF}$) is incrementally stepped in the same direction. If decreased, signal 526 ($V_{REF}$) is incrementally stepped in the opposite direction. Since the output voltage across DC-to-DC converter terminals 523 and 524 is fixed by the external DC-to-AC converter, the maximum power point of photovoltaic subarray 500 is captured when the maximum amplitude of $I_{OUT}$ is determined by this iterative, perturb-and-observe algorithm. The perturb-and-observe algorithm is ongoing to dynamically track the maximum power point of subarray 500 as environmental conditions change. Communication port 531 is a bi-directional serial communications link with the DC-to-AC converter. Control power for the DC-to-DC converter could either be derived from subarray 500 or from an external source.

Although not shown in FIG. 4 or 5 for clarity, contactors could be connected to automatically break any combination of current carrying DC-to-DC converter input and output conductors to isolate a faulted photovoltaic source or the entire DC-to-DC converter. Photovoltaic source ground fault currents could be sensed by measuring the differential current in both input conductors or by other know means. Photovoltaic source insulation resistance or leakage could be sensed and determined by any known means. A faulted DC-to-DC converter could be determined by self-diagnostics.

In FIG. 5, photovoltaic source 500 may be grounded to earth at the positive pole, terminal 501, the negative pole, terminal 502. Photovoltaic source 500 may also be configured as a grounded bipolar source where the photovoltaic source is split into positive and negative monopoles with a common, center earth ground.

Figure 6:
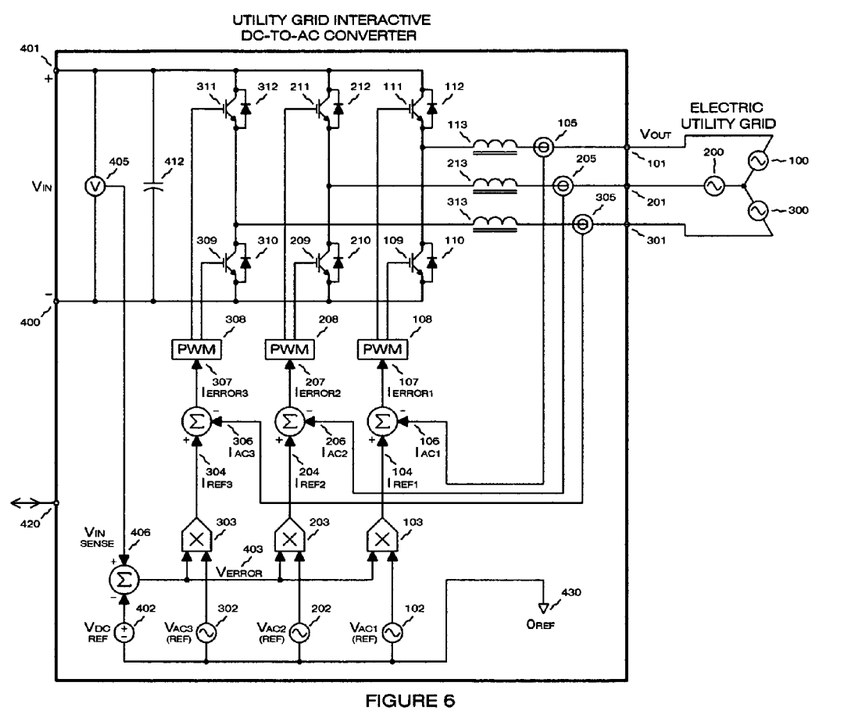
FIG. 6 is a simplified electrical schematic illustrating the preferred embodiment of the DC-to-AC converter electrical topology and control method according to the invention.

FIG. 6 illustrates the preferred embodiment of the DC-to-AC converter electrical topology and control method. The outputs of any number of DC-to-DC converters, as disclosed in FIG. 4 or 5, are connected in parallel at input terminals 401 and 400 and (electrically) across capacitor 412. Elements 110, 112, 210, 212, 310 and 312 are IGBT/diode pairs arranged as a typical six-pole, three-phase bridge. Designators 109, 111, 209, 211, 309 and 311 refer to the associated IGBT gate drives, respectively. Each half bridge section drives one phase of the electric utility grid. For example, IGBT/diode 110 and 112 connect through inductor 113 to output terminal 101 and utility grid phase 100. Current sensor 105 measures the current out of this half bridge section and into utility grid phase 100. In FIG. 6, all reference designators starting with 1, 2 and 3 are associated with utility phases 100, 200 and 300 respectively. The remaining half-bridge sections associated with utility phases 200 and 300 are connected in a similar manner. The electric utility grid is modeled as three ideal AC voltage sources. In operation, voltage sensor 405 senses the voltage across input terminals 401 and 400 to produce signal 406 ($V_{IN}$). A reference voltage 402 ($V_{DC\ REF}$) is set to be slightly higher than the peak-to-peak voltage of the electric utility grid (utility voltage sensing is not shown for clarity). Reference voltage 402 ($V_{DC\ REF}$) will be automatically adjusted within the range of utility high-line and low-line voltages as the utility voltages changes. Reference voltage 402 ($V_{DC\ REF}$) is compared to signal 406 ($V_{IN}$). Both signals 402 and 406 are scaled volt per volt. The difference between signals 402 and 406 is amplified and processed to create signal 403 ($V_{ERROR}$). Signals 102 ($V_{AC1}$), 202 ($V_{AC2}$) and 302 ($V_{AC3}$) are synthesized, low distortion, fixed amplitude sinewaves synchronized with utility grid voltages 100, 200 and 300 respectively. Point 430 is an arbitrary circuit ground reference for the control system. Signals 102 ($V_{AC1}$), 202 ($V_{AC2}$) and 302 ($V_{AC3}$) are multiplied by signal 403 ($V_{ERROR}$) by multiplier circuits 103, 203 and 303 respectively. The signals at the multiplier circuit outputs, signals 104 ($I_{REF1}$), 204 ($I_{REF2}$) and 304 ($I_{REF3}$) are identical to signals 102 ($V_{AC1}$), 202 ($V_{AC2}$) and 302 ($V_{AC3}$) except changed in amplitude as a linear function of signal 403 ($V_{ERROR}$). Signals 104 ($I_{REF1}$), 204 ($I_{REF2}$) and 304 ($I_{REF3}$) are the sinusoidal references or models for the desired current to be injected into phases 100, 200 and 300 of the utility grid. The current in each phase is independently regulated to its reference value by comparing the reference 104 ($I_{REF1}$), 204 ($I_{REF2}$) and 304 ($I_{REF3}$) to the actual phase current value (feedback), signals 106 ($I_{AC1}$), 206 ($I_{AC2}$) and 306 ($I_{AC3}$) respectively to generate error signals 107 ($I_{ERROR1}$), 207 ($I_{ERROR2}$) and 307 ($I_{ERROR3}$) respectively. Error signals 107 ($I_{ERROR1}$), 207 ($I_{ERROR2}$) and 307 ($I_{ERROR3}$) drive PWM circuits 108, 208 and 308, respectively.

In FIG. 6, each phase is driven from its respective PWM circuit in a similar way. For example when zero current is being regulated into phase 100 of the utility grid, gate drives 111 and 109 are switched in complementary fashion each substantially 50% on-time and 50% off-time. Inductor 113 averages the resultant high frequency pulses for a net current of zero. When it is desired to source current into phase 100 when the voltage of phase 100 is positive, the on-time to off-time ratio is increased on gate 111 and decreased on gate 109. To sink current from phase 100 when the voltage on phase 100 is negative, the on-time to off-time ratio is decreased on gate 111 and increased on gate 109. As such, the current in each three phases is regulated in a servo loop to replicated the current references 104 ($I_{REF1}$), 204 ($I_{REF2}$) and 304 ($I_{REF3}$).

FIG. 6 shows three AC current regulator servo loops, one for each phase and one DC voltage regulator servo loop that regulates the input voltage of the DC-to-AC converter across terminals 401 and 400. As previously discussed in this description of FIG. 6, signal 403 ($V_{ERROR}$) is the difference between the desired, regulated voltage at the DC-to-AC converter input 402 ($V_{DC\ REF}$) and actual feedback voltage 406 ($V_{IN}$). When 406 ($V_{IN}$) is higher than 402 ($V_{DC\ REF}$), 403 ($V_{ERROR}$) is increased, therefore increasing the amplitude of all three AC phase currents and therefore increasing the power into the utility grid and therefore reducing the DC-to-AC input voltage and 406 ($V_{IN}$) to the desired reference value 402 ($V_{DC\ REF}$). This can be accomplished because the outputs of all DC-to-DC converters connected to the input of the DC-to-AC converter are seen as current sources by the DC-to-AC converter. As the collective power available from all connected DC-to-DC converters changes so will signal 403 ($V_{ERROR}$) to regulate the DC-to-AC converter input voltage and all DC-to-DC converter output voltages to a bounded value ($V_{DC\ REF}$).

FIG. 6 shows a typical six-pole, three-phase bridge operating as the DC-to-AC polyphase current source converter. Other topologies, such as multi-level neutral clamp topologies could be used as well. While the DC-to-AC polyphase current source converter power topology is not part of this invention, the control method is.

FIG. 6 also shows a bi-directional serial communication interface 420 for connection to all DC-to-DC converters in the field. This communication link will be used for operational commands, status/fault reporting, diagnostics, data acquisition and other communication and data sharing functions.

Both DC-to-DC converter configurations disclosed and the DC-to-AC converter disclosed have some kind of microcontroller, microprocessor, digital signal processor or discrete logic control platform. Other ancillary circuits, component parts and functions such as, but not limited to, power supplies, sensors, contactors and switches are not shown, for clarity, in the figures provided.

A narrative description of what the invention is follows. The invention is a novel design for a solar photovoltaic power plant comprising a photovoltaic array, a plurality of distributed DC-to-DC converters, one central DC-to-AC inverter and the novel way in which these components interact. Each DC-to-DC converter transforms a portion of the total photovoltaic array to a current source capable of delivering current to the DC-to-AC converter at a voltage higher than that of the photovoltaic source. This transmission voltage between the DC-to-DC converters and the DC-to-AC converter is set by the DC-to-AC converter. Specifically, two novel DC-to-DC (more exactly, photovoltaic-to-DC current) converter topologies are disclosed, both operated by the same novel control method. In addition, a novel DC-to-AC converter control method is disclosed which works in concert with the DC-to-DC converter topologies and control method. The DC-to-AC converter power topology is not novel.

What I claim as my invention is:

1. An apparatus for converting DC power from solar photovoltaic sources to AC polyphase power and comprising a plurality of DC-to-DC power converter sections and a DC-to-AC power converter section each having an input and an output and where photovoltaic sources are connected to inputs of the DC-to-DC power converter sections and where the outputs of all DC-to-DC power converter sections are connected in parallel at and to the input of the DC-to-AC power converter section and where each DC-to-DC power converter section seeks and tracks the maximum power point voltage of a photovoltaic source connected at the input of each DC-to-DC converter section and where the output current of each DC-to-DC converter section is regulated as a current source over a range of voltages set by the DC-to-AC converter section and where the output of the DC-to-AC converter section is connected to and sources power into a polyphase electric utility grid where a DC-to-DC power converter section is used based on a typical, non-isolated boost converter topology but with an added inductor and freewheeling diode to provide more continuous output current and is further described as having plus and minus input and output terminals where the minus input and output terminals are electrically common and where there is a capacitor across said input terminals and where one end of a first inductor is connected to the plus input terminal and the other end of the first inductor is connected to the anode of a first rectifier and to a first semiconductor switch and where the remaining side of the first semiconductor switch is connected to the minus input terminal and where the cathode of the first rectifier is connected to the cathode of a second rectifier and to one end of a second inductor and where the other end of the second inductor is connected to the positive output terminal and where the anode of the second rectifier is connected to the minus output terminal.

2. An apparatus according to claim 1 where one end of a third inductor is connected to the plus input terminal and the other end of the third inductor is connected to the anode of a third rectifier and to a second semiconductor switch and where the remaining side of the second semiconductor switch is connected to the minus input terminal and where the cathode of the third rectifier is connected to the cathodes of the first and second rectifiers and where first and second semiconductor switches may, in certain modes of operation, be switched on and off at high frequencies where first semiconductor and second semiconductor switches never switch on at the same time and where this interleaved high frequency operation is intended to reduce the input and/or output voltage and/or current ripple at the switching frequency or switching frequency multiples of first and second semiconductor switches.

3. A solar photovoltaic power system comprising;
photovoltaic sources, a plurality of DC-to-DC converters, a DC buss and one DC-to-AC converter wherein;
each DC-to-DC converter has a voltage regulated DC input and a DC current source output and wherein;
said DC-to-AC converter comprises a DC input and polyphase AC current source outputs and wherein;
each of said polyphase AC current source outputs has an associated amplitude and wherein;
said voltage regulated DC input of each DC-to-DC converter is coupled to a distinct portion of said photovoltaic sources and wherein;
each said DC-to-DC converter further comprises a means for regulating a preferred voltage of each said distinct portion of said photovoltaic sources and wherein;
said DC buss provides a common coupling between all DC-to-DC converter outputs and said DC input of said DC-to-AC converter and wherein;
said DC-to-AC converter AC polyphase current source outputs are coupled to an AC polyphase electrical grid and wherein;
said DC-to-AC converter comprises a means for dynamically adjusting said amplitude of said polyphase current source outputs to regulate the voltage at said DC-to-AC converter DC input and of said DC buss wherein;
said DC-to-AC converter means for dynamically adjusting said amplitude of each of said polyphase current source outputs to regulate the voltage at said DC-to-AC converter DC input and of said DC buss further comprises, by any combination of hardware and software, an AC servo loop, an AC current sensor located to sense the current of at least one polyphase current source output, a DC servo loop, a DC input voltage sensor and a switch-mode pulse modulation circuit.

4. The solar photovoltaic power system according to claim 3 wherein said AC servo loop comprises a means for regulating said AC polyphase current source outputs to values or to follow waveforms set by an AC current reference generator.

5. The solar photovoltaic power system according to claim 3 wherein said DC servo loop comprises a means for regulating said voltage at said DC-to-AC converter DC input to a value set by a DC voltage reference.

6. The solar photovoltaic power system according to claim 3 further comprising a multiplier element wherein;
said multiplier element comprises any combination of hardware and software and furthermore where the word "coupling" is defined for reference as either mechanical coupling, electrical coupling, digital data coupling or any combination thereof and wherein;
said multiplier element comprises a first input, a second input and an output, wherein said output is a mathematical product of said first and second inputs and wherein;
said DC servo loop comprises; a means for creating a DC error output proportional to the difference of a DC input voltage sensor output and a DC voltage reference output wherein;
said DC error output is coupled to said multiplier element first input and wherein an output of an AC current reference generator is coupled to said multiplier element second input and wherein;
said AC servo loop comprises a means for creating an AC error output proportional to the difference of the output of said multiplier element and an output of said AC current sensor and wherein;
said AC error output is coupled to an input of said switch-mode pulse modulation circuit.

7. The solar photovoltaic power system according to claim 3 wherein said DC-to-DC converter means for regulating a preferred voltage of each said distinct portion of said photovoltaic sources comprises, by any combination of hardware and software, a DC servo loop, a DC output current sensor, a DC input voltage sensor, a DC voltage reference generator and a switch-mode pulse modulation circuit.

8. The solar photovoltaic power system according to claim 7 wherein;
said DC servo loop comprises a means for creating a DC error output proportional to the difference of a DC input voltage sensor output and a DC voltage reference generator output and wherein;
said DC error output is coupled to an input of said switch-mode pulse modulation circuit.

9. The solar photovoltaic power system according to claim 7 comprising a perturb-and-observe element wherein;
said perturb-and-observe element comprises any combination of hardware and software and furthermore where the word "coupling" is defined for reference as either mechanical coupling, electrical coupling, digital data coupling or any combination thereof and wherein;
said perturb-and-observe element comprises an input and an output and wherein;
said perturb-and-observe element input is coupled to an output of said DC output current sensor and wherein;
said perturb-and-observe element output is, in this configuration, said DC voltage reference generator output and wherein;
said perturb-and-observe element comprises a means for incrementally perturbing said DC voltage reference generator output and observing said DC current sensor output.

10. The solar photovoltaic power system according to claim 9 wherein said perturb-and-observe element comprises a means for maximizing the DC-to-DC converter output current as sensed by said DC output current sensor.

* * * * *